United States Patent Office 3,278,477
Patented Oct. 11, 1966

3,278,477
VINYL CHLORIDE PLASTISOLS
Robert W. Evans, Hamburg, Mich., assignor to The B. F. Goodrich Company, New York, N.Y., a corporation of New York
No Drawing. Filed Sept. 1, 1965, Ser. No. 484,452
13 Claims. (Cl. 260—30.4)

This is a continuation-in-part of my copending application Serial No. 140,200, filed September 25, 1961, now abandoned.

This invention relates to vinyl plastisols having improved adhesive properties and more particularly pertains to polyvinyl chloride resin plastisol compositions capable of adhering to a wide variety of surfaces, said plastisol composition being stable at ordinary temperatures for prolonged periods of time and to a method for preparing said plastisols, and ot articles coated and bonded therewith.

It is known to combine epoxy resins with a suspension of a polyvinyl chloride resin in a plasticizer and to cure the resulting mixture with a curing agent as set forth in U.S. Patents Nos. 2,795,565, 2,892,808 and 2,965,586, for instance. The curing agents usually suggested for use with epoxy resins generally do not give a final product having good adhesive properties.

An object of this invention is the provision of a novel curable plastisol which possesses remarkable adhesive properties. Another objects is to provide an easily curable vinyl resin plastisol. Yet another object is the provision of heat curable adhesive plastisols which are stable at ordinary temperatures. That these and other objects have been accomplished in accordance with the present invention will become apparent from the following description and examples.

I have discovered a novel polyvinyl chloride resin plastisol composition which cures readily at elevated temperatures with unexpectedly excellent adhesion for a wide variety of surfaces including unprimed metal surfaces, comprising a suspension of a polyvinyl chloride resin in a liquid plasticizer, a polyepoxide and a melamine compound containing at least two primary amine groups.

The novel compositions embodied herein will adhere to and bond as if primed, a variety of porous and non-porous surfaces, they are stable and they form tough, adherent films and coatings which maintain and enhance the desirable properties of polyvinyl chloride resins.

The polyvinyl chloride resins embodied herein are the homopolymers of vinyl chloride, copolymers and interpolymers of at least 70% by weight of vinyl chloride and up to about 30% by weight of one or more other vinyl monomers copolymerizable with vinyl chloride. For the purpose of this invention the other vinyl monomers which may be included in addition to the essential vinyl chloride in the polyvinyl chloride resins are those monomers having a

grouping. Such monomers include the other vinyl halides such as vinyl bromide, vinyl fluoride, vinylidene chloride, vinylidene bromide, vinylidene fluoride, chlorotrifluoro ethylene, 1,2-dichloroethylene, tetrafluoroethylene, and the like; the vinyl esters such as vinyl acetate, vinyl propionate, vinyl butyrate, vinyl benzoate, vinyl laurate, isopropenyl acetate, isopropenyl caproate, and the like; the acrylate and methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate, and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diamyl fumarates, the dihexyl fumarates, the diheptyl fumarates, the dioctyl fumarates, the didecyl fumarates, dicyclohexyl fumarate, diphenyl fumarate and the like; the vinyl aromatic monomers such as styrene, alpha-methyl styrene, the vinyl toluenes, the vinyl xylenes, vinyl naphthalene, and the like; the monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether and the like; vinyl cyanides such as acrylonitrile, methacrylonitrile, vinylidene cyanide and the like and others.

Most preferred are the interpolymers of from 70 to 100% by weight of vinyl chloride and from 0 to 30% by weight of at least one other monomer selected from the group consisting of

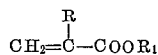

and

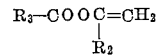

wherein R is a member of the group consisting of hydrogren and an alkyl group having from 1 to 4 carbon atoms, $R_1$ is a hydrocarbon group having from 1 to 2 carbon atoms, $R_2$ is a member selected from the group consisting of hydrogen and an alkyl group having from 1 to 4 carbon atoms and $R_3$ is a hydrogen group having from 1 to 12 carbon atoms. Even more preferred are the monomers in which $R_1$ and $R_3$ in the above formulas are alkyl groups having from 1 to 8 carbon atoms. Most preferred in this invention is an emulsion polymerized, dispersion grade homopolymer of vinyl chloride.

The liquid plasticizers useful in this invention may be described as the alkyl and alkoxy alkyl esters of dicarboxylic acids or the esters of a polyhydric alcohol and a monobasic acid and they include such materials as dibutyl phthalate, dioctyl phthalate, dibutyl sebacate, dinonyl phthalate, di-(2-ethyl hexyl) phthalate, di-(2-ethyl hexyl) adipate, glyceryl stearate and the like. Most preferred are the liquid diesters of aliphatic alcohols having from 4 to 20 carbon atoms and dibasic carboxylic acids having from 6 to 14 carbon atoms.

The polyepoxides embodied herein are compounds having a plurality of

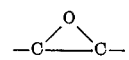

that is, vicinal epoxy, groups. They may be saturated or unsaturated, aliphatic, cycloaliphatic, aromatic or heterocyclic and may be substituted, if desired, with non-interfering substituents, such as chlorine atoms, hydroxyl groups, ether radicals, and the like. They also may be monomeric or polymeric.

The monomeric type of polyepoxide may be exemplified by the following: vinyl cyclohexene dioxide, epoxidized glycerides, as epoxidized soybean oil, butadiene dioxide, 1,4-bis(2(2,3-epoxypropyl) benzene, 1,3-bis-(2,3-epoxy-propoxy)benzene, 4,4'-bis(2,3-epoxy-propoxyl)diphenyl ether, 1,8-bis(2,3-epoxy-propoxy)octane, 1,4-bis-(2,3-epoxy-propoxy)cyclohexane, 4,4'-bis(2-hydroxy-3,4-epoxy-butoxy)diphenyl dimethyl methane, 1,3-bis(4,5-epoxy-pentoxy) - 5 - chlorobenzene, 1,4-bis(3,4-epoxy-butoxy)-2-chlorocyclohexane, diglycidyl ether, 1,3-bis(2-hydoxy-3,4-epoxy - butoxy)benzene, 1,4 - bis(2 - hydroxy-4,5 - epoxy-pentoxy)benzene, 1,2,5,6 - diepoxy-3-hexyne, 1,2,5,6-diepoxy hexane, 1,2,3,4-tetra(2-hydroxy-3,4-epoxy-butoxy)butane, and epoxy-substituted materials obtained by reacting diisocyanates with glycidol, such as compounds of the formula

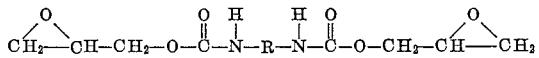

wherein R is a divalent organic radical.

Other monomeric polyepoxides include the glycidyl esters of polycarboxylic acids, or esters of diepoxide-substituted acids, such as diglycidyl phthalate, diglycidyl adipate, diglycidyl maleate, dibutyl ester of epoxidized dimerized linoleic acid.

Also included are the glycidyl polyethers of polyhydric phenols obtained by reacting a polyhydric phenol with an excess of a halogen containing epoxide in an alkaline medium. Thus, 2,2-bis(2,3-epoxy-propoxy phenyl)propane is obtained by reacting bis-phenol, [2,2-bis(4-hydroxy-phenyl)propane], with an excess of epichlorohydrin. Other polyhydric phenols that can be used for this purpose include resorcinol, or polynuclear phenols, such as 2,2-bis(4-hydroxy - phenyl)butane, 4,4'-dihydroxy benzophenone, bis(4-hydroxyl-phenyl)ethane, and 1,5-dihydroxy naphthalene. The halogen-containing epoxides may be further exemplified by 3-chloro-1,2-epoxy butane, 3-bromo-1,3-epoxy hexane, 3-chloro-1,2-epoxy octane, and the like.

Examples of the polymeric type of polyepoxidies include the polyepoxy polyhydroxy polyethers obtained by reacting, preferably in an alkaline or an acid medium, a polyhydric alcohol or a polyhydric phenol with a polyepoxide such as the reaction product of glycerol and bis(2,3-epoxy-propyl)ether, the reaction product of sorbitol and bis(2,3-epoxy-2-methyl propyl)ether, the reaction product of pentaerythritol and 1,2-epoxy-4,5-epoxy-pentane, and the reaction product of bis-phenol and bis(2,3-epoxy-2-methyl propyl)ether, the reaction product of resorcinol and bis(2,3-epoxy-propyl)ether, and the reaction product of catechol and bis(2,3-epoxy-propyl)ether.

A further group of the polymeric polyepoxides comprises the hydroxy-substituted polepoxy polyethers obtained by reaction, preferably in an alkaline medium a slight excess, e.g., 0.5 to 3 mole excess, of a halogen-containing epoxide as described above, with any of the aforedescribed polyhydric phenols, such as resorcinol, catechol, bis-phenol, bis(2,2'-dihydroxy - dinaphthyl) methane, and the like.

Also included within this group are the polyepoxy polyethers obtained by reacting, preferably in the presence of an acid-acting compound, such as hydrofluoric acid, one of the aforementioned halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and the like. Illustrative of these polymers are poly (allyl 2,3-epoxy-propyl ether), poly(2,3-epoxy-propyl crotonate), allyl-2,3-epoxy-propyl ether styrene copolymer, poly(vinyl 2,3-epoxy-propyl ether), allyl glycidyl ether acetate copolymer and poly(4-glycidyloxystyrene).

Particularly useful in the present invention are the low molecular weight, liquid glycidyl polyethers of dihydric phenols obtained by reacting epichlorohydrin with a dihydric phenol in an alkaline medium. The monomeric products of this type may be represented by the general formula

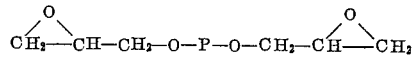

wherein P represents a divalent hydrocarbon radical of the dihydric phenol. The polymeric products will generally not be a single simple molecule but will be a complex mixture of glycidyl polyethers of the general formula

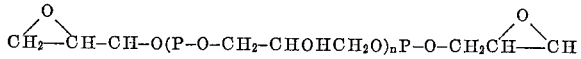

wherein P is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may, in some cases, contain a very small amount of material with one or more of the terminal glycidyl radicals in hydrated form.

A specific example of a liquid polyepoxide which is useful in the present invention is Epon 828, a pourable (160 poises at 25° C.), liquid epoxy resin having a melting point of 8–12° C. and an epoxide equivalency of 190 to 210 and is formed by reaction of 4'4-dihydroxy-diphenyl propane and epichlorohydrin in a molar ratio, respectively of about 1:2. Epon 562 is substantially Epon 828 plus a mixture of glycerol and epichlorohydrin and having a viscosity of about 0.8 poise at room temperature. Similar polyepoxides may also be used.

Still other specific types of polyepoxides useful herein are diisodecyl 4,5-epoxytetrahydrophthalate, epoxidized soybean oil and compounds having the following structures

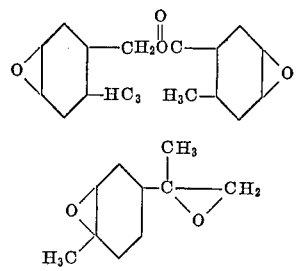

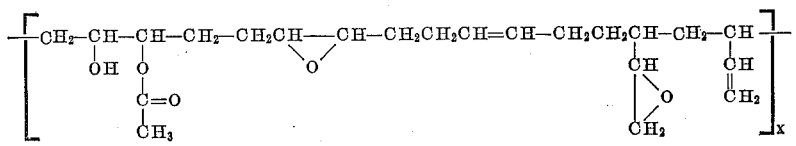

the last described polymer has an hydroxyl content of about 2.5, a viscosity of about 1800 poises at 25° C., an iodine number of about 185 and an epoxy content of about 9.

Other polyepoxides useful in the present invention and methods for preparing them are set out in U.S. Patents Nos. 2,581,464, 2,260,753 and 2,327,053 and in Chemical Week, vol. 69, page 27, for September 8, 1951.

Curing agents normally used with polyepoxides do not function in the present invention. The boron trifluoride-amine complexes, anhydrides and carboxylic acids generally cause excessive cross-linking and resultant film brittleness with little or no adhesion to substrates. The usual amines are either too reactive (short pot life), they tend to degrade the polyvinyl chloride resin during fusion, or they do not impart good adhesion to the resulting cured films. It is indeed unexpected that the only curing agents useful in the present invention are those set out below, all of which must contain at least two primary amine groups per molecule.

The curing agents embodied in the present invention may be generally described as melamines having the formula

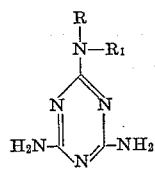

wherein R and $R_1$ may be the same or different and R and $R_1$ is each selected from the group consisting of hydrogen and a hydrocarbon group having from 1 to 8 carbon atoms. Most preferred are curing agents of the foregoing formula wherein R and $R_1$ is each selected from the group consisting of hydrogen, an aliphatic hydrocarbon group having from 1 to 8 carbon atoms and an olefin group free of aromatic double bonds having from 2 to 8 carbon atoms. Illustrative curing agents of the type embodied herein are the following:

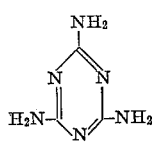

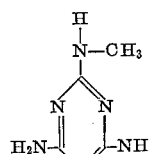

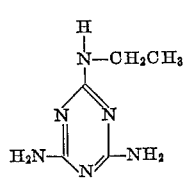

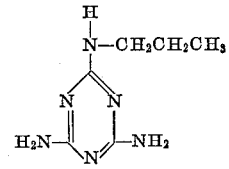

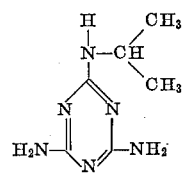

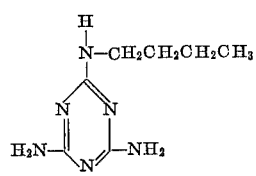

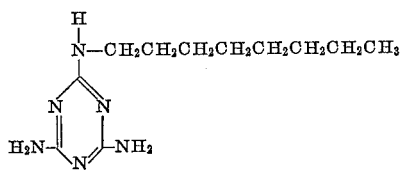

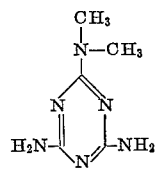

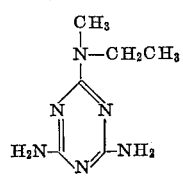

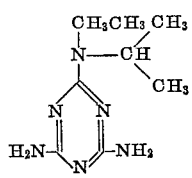

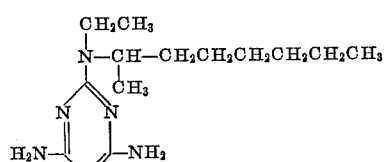

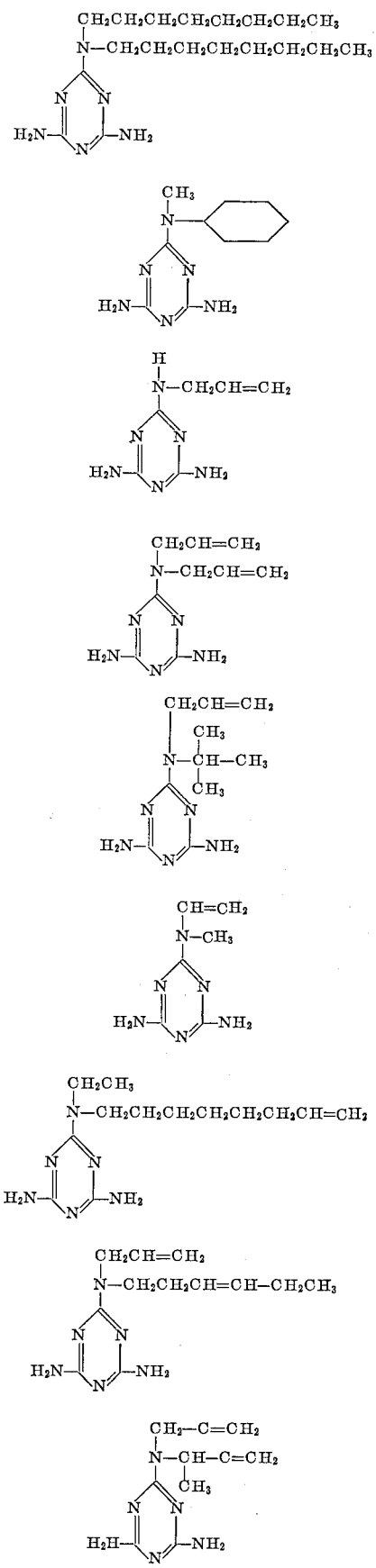

In general the plastisol compositions embodied herein should contain from 60 to 150 parts by weight of combined liquid plasticizer-polyepoxide per 100 parts by weight of the polyvinyl chloride resin. The foregoing liquid component can be made up of from 20 to 70% by weight of the polyepoxide and from 80 to 30% by weight of plasticizer.

The amount of amine curing agent required to cure a given polyepoxide is usually expressed in terms of equivalents. Epon 828, for instance, has an equivalent weight of 195 and 50 grams of Epon 828 would represent 0.256 equivalents of epoxy. N,N-diallyl melamine, for instance, has an equivalent weight of 51 and the theoretical amount of N,N-diallyl melamine needed to react completely with 50 grams of Epon 828 would be the product of 51 and 0.256 or 13.06 grams of the melamine. In practice it has been found that from about 30 to about 300% of the theoretical equivalent weight of melamine curing agent may be used. In applications where the thickness of the plastisol is from about 1 to 8 mils thick a level of from about 150% to about 300% of the theoretical equivalent amount of melamine curing agent may be used. In applications where the plastisol is used in thicker applications, as 20 mils to ¼″ and thicker, from 40 to 60% may be used. In general adhesive applications from about 75 to 150% is used.

Pigments, fillers, stabilizers and the like may be incorporated in the instant compositions if desired without departing from the spirit and scope of the present invention. Usually, in the case of polyvinyl chloride the customary heat and light stabilizers are added.

It is preferred in the present invention to use from about 0.5 to about 5 parts by weight based on the weight of the polyvinyl chloride resin of a basic vinyl stabilizer. Most preferred is a level of from about 1 to about 3 parts of an inorganic basic lead stabilizer such as basic lead carbonate, dibasic lead phosphite, dibasic lead phthalate, tribasic lead sulfate, lead salicylate, lead stearate, dibasic lead stearate, tribasic lead maleate and basic lead silicate. For a more complete discussion of the use of lead stabilizer in polyvinyl chloride resins see "Rubber and Plastics Weekly," July 15, 1961, pages 82–83. Most preferred of the inorganic basic lead salts because of its relative cheapness and ready availability is basic lead carbonate which also unexpectedly enhances the cure rate of the plastisol compositions.

The method of making the plastisol compositions of this invention is not critical. It is usually desirable to disperse well the melamine curing agent and the stabilizer in a portion of the liquid phase and then mix the remainder of the liquid phase and the dispersion with the polyvinyl chloride resin at room temperature or slightly above in any conventional mixing equipment. Pigments, fillers, coloring agents and the like may be incorporated into the plastisol by conventional means.

The heat curable plastisols embodied herein are stable for long periods of time at temperatures up to 100° F. and higher. Films and coatings of the plastisol compositions of this invention are cured by heating them at a temperature of from about 325° F. to about 410° F. for from about to ten to forty minutes.

The plastisol compositions embodied herein are excellently suited for the production of coatings, laminated materials, intermediate materials, printing pastes and castings.

The films and coatings resulting from curing the plastisol compositions embodied herein are flexible and have unusually good adhesive properties which makes them particularly useful for coating and bonding surfaces of metals, glass, ceramic materials, wood, leather, fabrics of both synthetic and natural fibers, and the like. Most preferred are coated metals such as iron, steel, galvanized steel, stainless steel, aluminum, magnesium, tin plate, copper and brass.

In the following examples which will serve to illustrate the present invention the amounts of ingredients used are expressed in parts by weight unless otherwise indicated.

Example I

Homogeneous mixtures were prepared wherein the solids were first finely ground and dispersed in a portion of the plasticizer from the following ingredients:

|  | A | B | C | D | E | F |
|---|---|---|---|---|---|---|
| Geon 121 [1] | 100 | 100 | 100 | 100 | 100 | 100 |
| Dioctyl adipate | 20 | 20 | 20 | 20 | 20 | 20 |
| Epon 828 | 50 | 50 | 50 | 50 | 50 | 50 |
| m-Phenylene diamine | 2.93 | | | | | |
| o-Phenylene diamine | | 2.93 | | | | |
| Beta-Naphthylamine | | | 7.48 | | | |
| Benzidine | | | | 4.81 | | |
| p-Phenylene diamine | | | | | 2.93 | |
| N,N-Diallyl melamine | | | | | | 5.4 |
| Basic lead carbonate | 2.0 | 2.0 | 2.0 | 2.0 | 2.0 | 2.0 |

[1] A polyvinyl chloride paste resin characterized by being a vinyl chloride polymer of controlled particle size which can be dispersed as organisol or plastisol to make a paste of consistency for spread or dip coating.

All of the above formulations A–F were initially pourable. Formulations A and D gelled completely in 8 hours at room temperature, formulation B gelled completely in one week at room temperature, formulation E gelled completely in 1 hour at room temperature and formulation F appeared to have an indefinite pot life (several months with substantially no change in viscosity).

Uniform films of the above formulations B, C and F were spread with a calibrated draw bar on iron panels the surface of which had been cleaned previously with methyl ethyl ketone. The coated panels were then heated in an air oven at the temperatures and for the times indicated below. The adhesion values are expressed as the force in pounds per inch required to strip the cured film from the panel. The adhesion tests were carried out on a Scott L-6 tester.

| Cure Conditions | B | C | F |
|---|---|---|---|
| 15' at 250° F | 1 | No adhesion | 1 |
| 15' at 375° F | 18 | do | 31 |
| Flexibility of films (180° bending of film after adhering to metal 15' at 375° F.) | ([1]) | Flexible | ([2]) |

[1] Brittle.
[2] Flexible.

Baked film F was found to be completely insoluble in tetrahydrofuran (the uncured plastisol was completely miscible with this solvent). These tough films and coatings have excellent ageing and weathering characteristics, resist dirt and soiling and retain their gloss under adverse conditions.

Example II

A formulation was prepared in a manner similar to that of Example I using an ink mill to disperse the solid ingredients in the plasticizer and for making the final formulation from the following ingredients:

| | |
|---|---|
| Geon 121 polyvinyl chloride | 100 |
| Dioctyl adipate | 30 |
| Epon 828 | 50 |
| N,N-diallyl melamine (60% paste in dioctyl adipate) | 12 |
| Basic lead carbonate (75% by weight paste in dioctyl adipate) | 2 |
| Harshaw 8V100 [1] | 2 |

[1] An organic phosphite chelating agent which ties up traces of heavy metal ions, maintains clarity and lowers viscosity of the formulation.

Clean metal panels were coated with uniform 20 mil coatings of the foregoing formulation. After curing the films a portion of each film was fastened in the jaws of a grip on the Scott L-6 tester and the adhesion of the remainder of the film to the metal was determined in pounds per inch at a pull of 2 inches per minute using one-inch wide panels.

| Substrate: | Curing conditions, 15' at 400° F., lbs. |
|---|---|
| Steel, chromic acid treated | 50 |
| Steel, zinc phosphate coated | 35 |
| Steel, galvanized (ASTMA 93) | 28 |
| Aluminum, washed with methyl ethyl ketone | 29 |
| Aluminum, Alodine (spec. M. 1C5441) | 28 |
| Brass, 70/30 alloy (10' at 400° F.) | 10 |

Example III

The recipe used in Example II was used employing melamine and the various substituted melamines shown below at 55% epoxy equivalent. Films were prepared on steel panels and adhesion tests were run as described in Example II.

| Curing Agent | Cure at 400° F. for— | |
|---|---|---|
| | 12 min. | 19 min. |
| Melamine, pounds | | 29 |
| N,N-Dimethyl melamine, pounds | 30 | |
| N,N-Diethyl melamine, pounds | 27 | |
| N,N-Diisopropyl melamine, pounds | 19 | |
| N,N-di-n-Propyl melamine, pounds | 24 | |
| N,N-Diallyl melamine, pounds | 26 | |

All of the foregoing formulations had indefinitely long pot lives at about 25° C.

Example IV

The formulation used is as follows:

| | |
|---|---|
| Geon 121 | 100. |
| Dioctyl adipate | 20. |
| Epon 828 | 50. |
| Basic lead carbonate | 2. |
| Amine | 41% of epoxy equivalent. |

| Curing agent | O-phenylenediamine | BF₃-monoethylamine complex | N-methyl-p-phenylenediamine | N,N-Diallyl-melamine |
|---|---|---|---|---|
| | Less than 1 week | Indefinite | 18 hours | Indefinite. |

Films of each formulation were made on methyl ethyl ketone washed steel panels and the films were fused at 400° F. for 15 minutes with the following results.

| Curing agent: | Adhesion, lbs. per inch |
|---|---|
| o-Phenylene diamine | 11. |
| BF$_3$-ethyl amine complex | 5. |
| N-methyl p-phenylene diamine | No adhesion. |
| N,N-diallyl melamine | 27. |

The cured films from the formulations using o-phenylene diamine, BF$_3$-ethyl amine complex and N-methyl p-phenylene diamine were soluble in tetrahydrofuran and the remaining films were insoluble in this solvent. N,N'-diallyl melamine behaved in a manner similar to that of N-methyl p-phenylene diamine in the above tests.

I claim:
1. A vinyl chloride resin plastisol composition capable of curing to a flexible condition when heated at temperatures in the order of 325 to 410° F. and of adhering tenaciously to unprimed solid surfaces when in contact therewith and heated to said temperatures in contact therewith, said composition comprising as essential ingredients:
   (1) particles of polyvinyl chloride resin, dispersed in (2) and (3),
   (2) a liquid plasticizer for polyvinyl chloride,
   (3) a liquid polyepoxide containing a plurality of vicinal epoxy groups, and
   (4) a melamine curing agent,
there being present in said composition:
   (a) from 60 to 150 parts by weight of (2) and (3) combined for each 100 parts by weight of (1),
   (b) from 20 to 70% by weight of (3) based on the total of (2) and (3), and
   (c) from 30 to 300% of an equivalent weight of (4) based on the number of vicinal epoxy equivalent weights in (3),
said liquid polyepoxide being a compound of the formula:

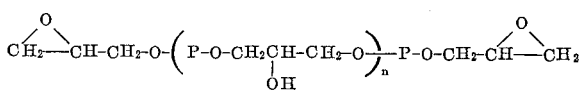

where P is

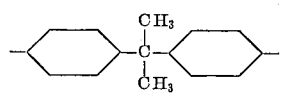

and $n$ is a number from 0 to 3, and said melamine curing agent being a compound of the formula

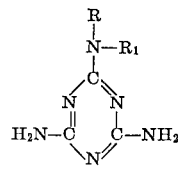

wherein R is an aliphatic hydrocarbon of 1 to 8 carbon atoms and $R_1$ is elected from the class consisting of R and hydrogen.

2. The composition of claim 1 wherein the melamine curing agent is N,N-diallylmelamine.
3. The composition of claim 1 wherein the melamine curing agent is an N,N-dialkylmelamine containing 1 to 8 carbon atoms in each alkyl group.
4. The composition of claim 3 wherein the N,N-dialkylmelamine is N,N-dimethylmelamine.
5. The composition of claim 3 wherein the N,N-dialkylmelamine is N,N-diethylmelamine.
6. The composition of claim 3 wherein the N,N-dialkylmelamine is an N,N-dipropylmelamine.

7. The composition of claim 2 wherein (c) is from 30-80%.
8. The composition of claim 2 wherein (c) is from 75 to 150%.
9. A vinyl chloride resin plastisol composition capable of forming flexible, strongly-adherent coatings on unprimed metal surfaces when spread thereon and heated for 10 to 15 minutes at a temperature of about 400° F., said composition comprising the following essential ingredients in the following parts by weight ratios:

| Ingredient— | Parts by wt. |
|---|---|
| (1) polyvinyl chloride resin particles, amulsion polymerized, dispersed in (2) and (3) | 100 |
| (2) a plasticizer for (1) selected from the class consisting of dialkyl phthalates and dialkyl adipates, each having from 4 to 8 carbon atoms in each alkyl group | 20 to 35 |
| (3) a liquid polyepoxide having an epoxide equivalency of about 190 to 210 formed by the reaction of about 1 mole of 4,4'-dihydroxy-diphenyl propane with about 2 moles of epichlorohydrin | 50 |
| (4) N,N-diallylmelamine | 4 to 12 |

10. A vinyl chloride resin plastisol composition capable of curing to a flexible condition when heated at temperatures in the order of 325 to 410° F. and adhering tenaciously to unprimed solid surfaces when in contact therewith and heated to said temperatures in contact therewith, said composition comprising as essential ingredients:
   (1) particles of polyvinyl chloride resin, dispersed in (2) and (3),
   (2) a liquid plasticizer for polyvinyl chloride,
   (3) a liquid polyepoxide containing a plurality of vicinal epoxy groups, and
   (4) a melamine curing agent,
   (5) basic lead carbonate,
there being present in said composition:
   (a) from 60 to 150 parts by weight of (2) and (3) combined for each 100 parts by weight of (1),
   (b) from 20 to 70% by weight of (3) based on the total of (2) and (3), and
   (c) from 30 to 300% of an equivalent weight of (4) based on the number of vicinal epoxy equivalent weights in (3),
   (d) from 0.5 to 5 parts by weight per 100 of polyvinyl chloride of (5),
said liquid polyepoxide being a compound of the formula:

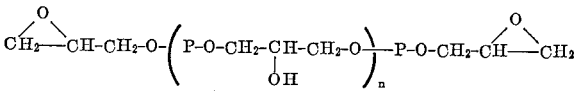

where P is

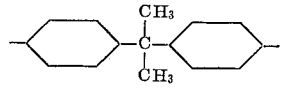

and $n$ is a number from 0 to 3, and said melamine curing agent being a compound of the formula

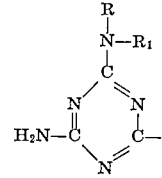

wherein R is an aliphatic hydrocarbon of 1 to 8 carbon atoms and $R_1$ is selected from the class consisting of R and hydrogen.

11. A metal surface having disposed thereon and bonded thereto a plastisol composition bound in adherent relation to said metal surface by heating said metal coated with said plastisol at a temperature in the order of about 325° C. to 410° C., said plastisol composition comprising:
(1) particles of polyvinyl chloride resin, dispersed in (2) and (3),
(2) a liquid plasticizer for polyvinyl chloride,
(3) a liquid polyepoxide containing a plurality of vicinal epoxy groups, and
(4) a melamine curing agent,
there being present in said composition:
(a) from 60 to 150 parts by weight of (2) and (3) combined for each 100 parts by weight of (1),
(b) from 20 to 70% by weight of (3) based on the total of (2) and (3), and
(c) from 30 to 300% of an equivalent weight of (4) based on the number of vicinal epoxy equivalent weights in (3),
said liquid polyepoxide being a compound of the formula:

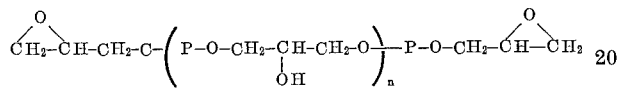

where P is

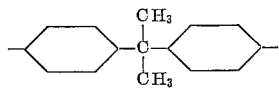

and $n$ is a number from 0 to 3, and said melamine curing agent being a compound of the formula

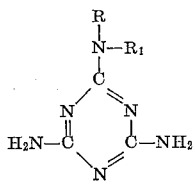

wherein R is an aliphatic hydrocarbon of 1 to 8 carbon atoms and $R_1$ is selected from the class consisting of R and hydrogen.

12. An article comprising a base metal having integrally bonded and adhered to a surface thereof a plastisol composition comprising
(1) particles of polyvinyl chloride resin, dispersed in (2) and (3),
(2) a liquid plasticizer for polyvinyl chloride,
(3) a liquid polyepoxide containing a plurality of vicinal epoxy groups, and
(4) a melamine curing agent,
there being present in said composition:
(a) from 60 to 150 parts by weight of (2) and (3) combined for each 100 parts by weight of (1),
(b) from 20 to 70% by weight of (3) based on the total of (2) and (3), and
(c) from 30 to 80% of an equivalent weight of (4) based on the number of vicinal epoxy equivalent weights in (3),
said liquid polyepoxide being a compound of the formula:

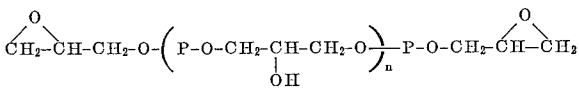

where P is

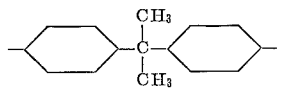

and $n$ is a number from 0 to 3, and said melamine curing agent being a compound of the formula

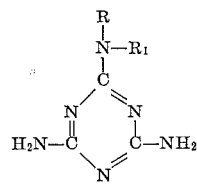

wherein R is an aliphatic hydrocarbon of 1 to 8 carbon atoms and $R_1$ is selected from the class consisting of R and hydrogen, obtained by heating said plastisol composition in contact with said metal surface at a temperature of about 325° to 410° whereby said plastisol and metal surface are bonded together.

13. The article of claim 12 wherein the melamine curing agent is N,N-dimethylmelamine.

References Cited by the Examiner
UNITED STATES PATENTS

| | | | |
|---|---|---|---|
| 2,548,447 | 4/1951 | Shokal et al. | 260—47 |
| 2,795,565 | 6/1957 | Newey | 260—30.4 |
| 2,891,026 | 6/1959 | Wasserman | 260—30.4 |
| 2,925,403 | 2/1960 | Shokal | 260—836 |
| 2,965,586 | 12/1960 | Fisch et al. | 260—836 |
| 3,030,247 | 4/1962 | Schurb | 260—47 |

MORRIS LIEBMAN, *Primary Examiner.*

ALLAN LIEBERMAN, *Examiner.*

L. T. JACOBS, *Assistant Examiner.*

UNITED STATES PATENT OFFICE
CERTIFICATE OF CORRECTION

Patent No. 3,278,477            October 11, 1966

Robert W. Evans

It is hereby certified that error appears in the above numbered patent requiring correction and that the said Letters Patent should read as corrected below.

Column 1, line 18, for "ot" read -- to --; line 29, for "objects" read -- object --; column 2, line 45, for "1 to 2" read -- 1 to 12 --; line 48, for "hydrogen" read -- hydrocarbon --; column 3, line 10, for "1,4-bis(2(2,3-epoxypropyl)" read -- 1,4-bis(2,3-epoxypropyl) --; line 17, for "hydoxy" read -- hydroxy --; column 4, line 18, after "ether", second occurrence, insert -- vinyl --; lines 38 and 39, the extreme right-hand portion of the formula reading "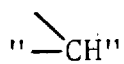"     read     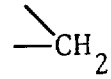 .

line 53, for "4',4-" read -- 4,4' --; lines 65 to 70, the formula should appear as shown below instead of as in the patent:

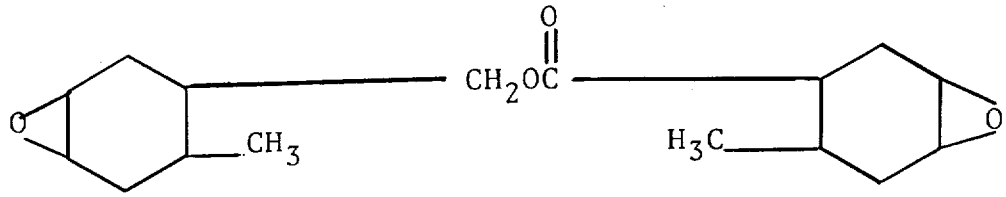

column 9, line 44, for "250° F." read -- 350° F. --; column 11, line 63, for "elected" read -- selected --; column 13, lines 41 to 43, the left-hand portion of the formula should appear as shown below instead of as in the patent:

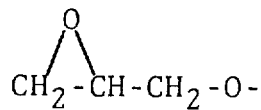

column 14, line 33, for "325° to 410°" read -- 325° to 410° F. --.

Signed and sealed this 26th day of September 1967.

(SEAL)
Attest:

ERNEST W. SWIDER
Attesting Officer

EDWARD J. BRENNER
Commissioner of Patents